Feb. 27, 1923.
H. F. KUECHLER
AUTOMOBILE SIGNAL LIGHT
Filed Mar. 14, 1922
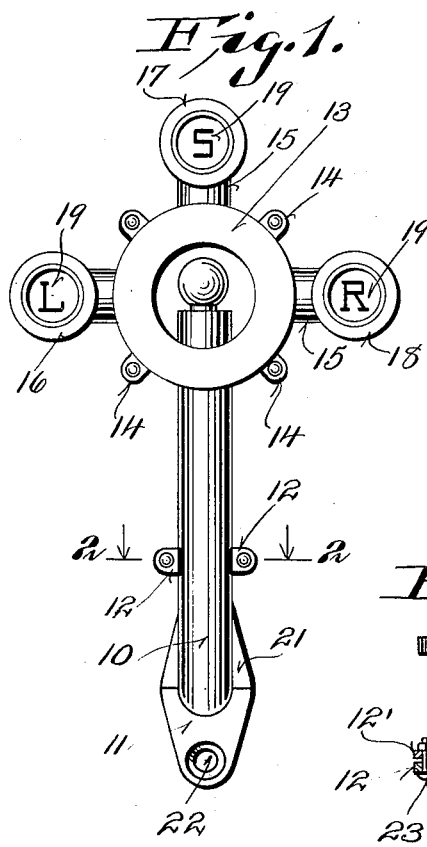
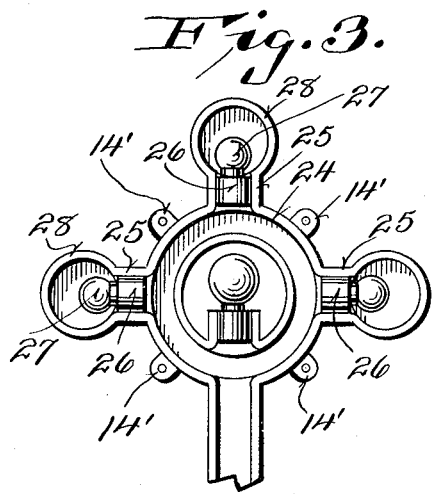
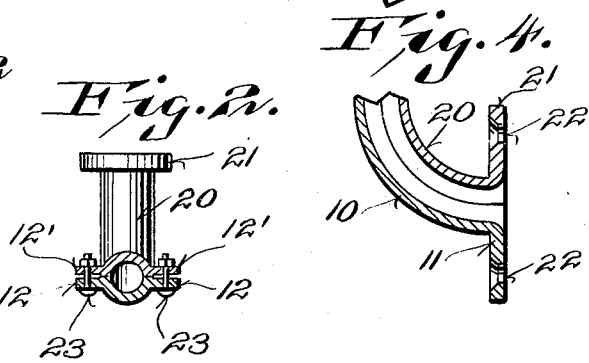
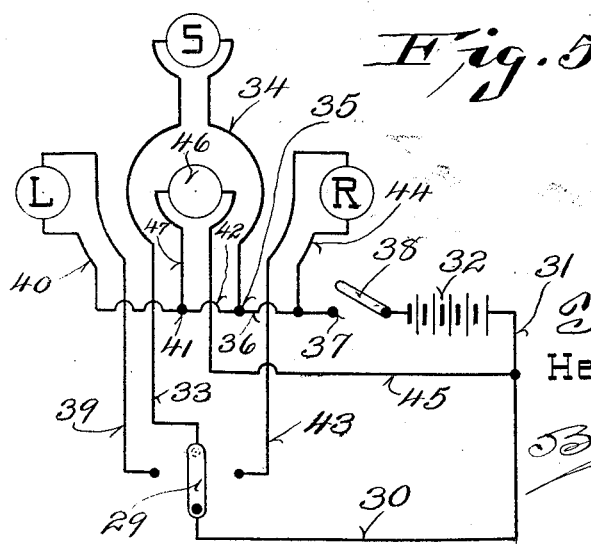
Inventor
Hermann F. Kuechler Patented Feb. 27, 1923.

1,446,909

UNITED STATES PATENT OFFICE.

HERMANN F. KUECHLER, OF KENOSHA, WISCONSIN.

AUTOMOBILE SIGNAL LIGHT.

Application filed March 14, 1922. Serial No. 543,574.

*To all whom it may concern:*

Be it known that I, HERMANN F. KUECHLER, a citizen of the United States, and resident of Kenosha, in the county of Kenosha and State of Wisconsin, have invented certain new and useful Improvements in Automobile Signal Lights; and I do hereby declare that the following is a full, clear, and exact description thereof.

The invention relates to automobile signal lights of the type adapted to be affixed to the rear of the vehicle for signalling to drivers of machines in the rear.

It comprises a pair of somewhat similar housing sections having flanges by which they are secured to the machine and lugs by which they are secured to each other, a plurality of lamps and casings enveloping the lamps and rigid with the housing members. The housing members are adapted to cover the electric leads.

A primary object of the invention is the provision of a structure, the parts of which are readily assembled and separated, which is secure in position, strong, durable, which supplies normally a tail light which is adapted by the mere manipulation of a switch to illuminate a lamp and thus signal a left or right hand turn, or a stop, which is reliable, which is simple in outline and construction, being extremely easy to manufacture, and which completely houses the electric connections.

With the above and other objects in view which will appear as the description proceeds, my invention resides in the novel construction, combination and arrangement of parts substantially as hereinafter described and more particularly defined by the appended claim, it being understood that such changes in the precise embodiment of the herein disclosed invention may be made as come within the scope of the claim.

In the accompanying drawing, I have illustrated one complete example of the physical embodiment of the present invention constructed according to the best mode I have so far devised for the practical application of the principles thereof, and in which:

Figure 1 is a side elevation of the device.

Figure 2 is a cross section on the line 2—2 of Figure 1.

Figure 3 is a side elevation of the forward housing and associated parts.

Figure 4 is a cross section, part of the housing members and the flanges integral therewith, and Figure 5 is the diagrammatic view of the electrical leads.

Rear housing 10 is integral with flange 11 and extends in a curve therefrom upwardly to a point adjacent lugs 12 from which it stretches vertically to annulus 13, having four radially directed integral lugs 14 thereon, and three radial arms 15, terminating in front casings 16, 17 and 18, the casings having glasses 19 therein for transmitting light. The glasses have opaque letters which are adapted to stand out in contrast to the light for signalling purposes, casing 16 having a left turn signal, casing 17 a stop and casing 18 a right turn signal.

Forward housing 20 has a flange 21 integral therewith, and having a surface substantially continuous with that of flange 11, the flanges having countersunk openings 22 therein for the reception of screws by which the housings are secured to the machine. Housings 10 and 20 have mating edges and are secured together, as shown in Figure 2, by bolts 23 directed thru lugs 12 and 12'. Forward housing 20 is integral with forward annulus 24, having lugs 14' thereon adapted to be secured by bolts to lugs 14. Arms 25 are radially directed from the annulus and receive sockets 26, in which lamps 27 are secured, enveloped by forward casings 28 and rearward casings 16, 17 and 18. The housings 10 and 20 completely envelop the electrical leads leading upwardly and thru annuli 13 and 24 to lamps 27.

A switch 29 on lead 30 connecting with lead 31 from battery 32, may be manually or automatically actuated to contact with a terminal of wire 33 running to one of the lamps from which wire 34 runs back, and at point 35 connects with wire 36, which leads to a contact 37, which, when the device is in operation, closes a circuit thru switch 38. Switch 38 is a control by means of which the device may be thrown entirely in or out of operation. For a left hand signal, switch 29 may be moved to the left directing a circuit thru lead 39, and wire 40, which at 41 connects with wire 42, which at 35 connects with wire 36. A movement of switch 29 to the right directs a current thru wires 43 and 44, which is connected with wire 36.

A lead 45 connects with lead 31 and is in circuit with the normal tail light 46, lead 47 and leads 42 and 36, so that the tail light is illuminated when switch 38 bears on contact 37. Thus it is apparent that normally when a device is in operation, we have an illuminated tail-light 46 and that at any time, a left hand stop or right hand turn signal may be thrown on.

I claim:

In an automobile signal light, the combination of a rear housing, a forward housing, said housings having mating edges, and being circular in cross section, an annulus integral with said rearward housing, an annulus integral with said forward housing, said annuli having mating edges, a plurality of arms on said rearward annulus, a plurality of arms on said forward annulus, said arms having mating edges, a rearward casing on each of said first mentioned arms, a forward casing in each of said second mentioned forward arms, a plurality of lamps, each of said forward casings cooperating with one of said rearward casings to enclose one of said lamps, means for securing said housings together, means for securing said housings to an automobile, a lamp carried by said annuli, and electrical means for illuminating said last mentioned lamp continuously and manually operable means to illuminate any one of said first mentioned lamps.

In testimony that I claim the foregoing I have hereunto set my hand at Milwaukee, in the county of Milwaukee and State of Wisconsin.

HERMANN F. KUECHLER.